United States Patent Office 3,141,162
Patented July 14, 1964

3,141,162
PULSE DOPPLER TRACKING RADAR
Whitfield W. Moretti, New Hyde Park, and Isaac R. Hoxie, Jr., Huntington, N.Y., assignors to Sperry Rand Corporation, Great Neck, N.Y., a corporation of Delaware
Filed Oct. 12, 1959, Ser. No. 846,029
5 Claims. (Cl. 343—7)

The present invention generally relates to pulse doppler tracking radars and, more particularly, to means for the elimination of undesirable tracking response in such radars occurring at certain critical target velocities.

It is well known that the response of pulse doppler radar receivers is susceptible to the radial velocity of a target. This phenomenon ordinarily is beneficial because it provides a basis for the discrimination against targets having zero or relatively low radial velocities. Such radars may be designed to selectively respond only to targets having substantial radial velocities whereby objectionable clutter return is essentially eliminated.

Along with the beneficial characteristic of clutter elimination, an undesirable response feature arises which is peculiar to pulse doppler radars and not shared by continuous wave doppler radars. The doppler frequency of a target signal which is linearly proportional to target radial velocity in a continuous wave system is discontinuously related to target velocity in the case of a pulse doppler radar system. That is, as target radial velocity increases toward particular critical values, the corresponding detected doppler frequency apparently reduces to zero. Such target velocities are known in the art as "blind speeds" and correspond to doppler frequencies which are integral multiples of the radar pulse repetition rate.

One proposed solution to the problem of avoiding "blind speeds" contemplates the continuous variation or jittering of the radar pulse repetition rate. In the case of target tracking radars, however, such jittering of the repetition rate produces spurious responses in the range and angle tracking circuits. These spurious responses which hinder efficient target tracking seriously detract from the advantage gained by the minimization of the "blind speed" characteristic.

It is the principal object of the present invention to minimize the susceptibility of pulse doppler tracking radars to critical target velocities.

Another object of the invention is to provide in a pulse doppler tracking radar means for the concurrent elimination of "blind speeds" and spurious tracking responses.

A further object is to provide means for the automatic shifting of repetition rate in a pulse doppler tracking radar.

Another object is to adjust the repetition rates of a pulse doppler tracking radar as a function of target radial velocity.

These and other objects of the present invention, as will be seen upon a reading of the following specification, are accomplished in a preferred embodiment by the provision of automatic pulse repetition rate switching means which is responsive to the doppler audio frequency of demodulated target signals to selectively control the pulse repetition rate of the radar transmitter. The switching means is adapted to shift the radar repetition rate between a plurality of preselected values each time that the doppler audio signal frequency assumes either a predetermined lower value or a higher value, the latter of which is determined by the repetition rate presently in use.

For a more complete understanding of the invention, reference should be had to the following specification and to the drawings of which:

Figure 1:
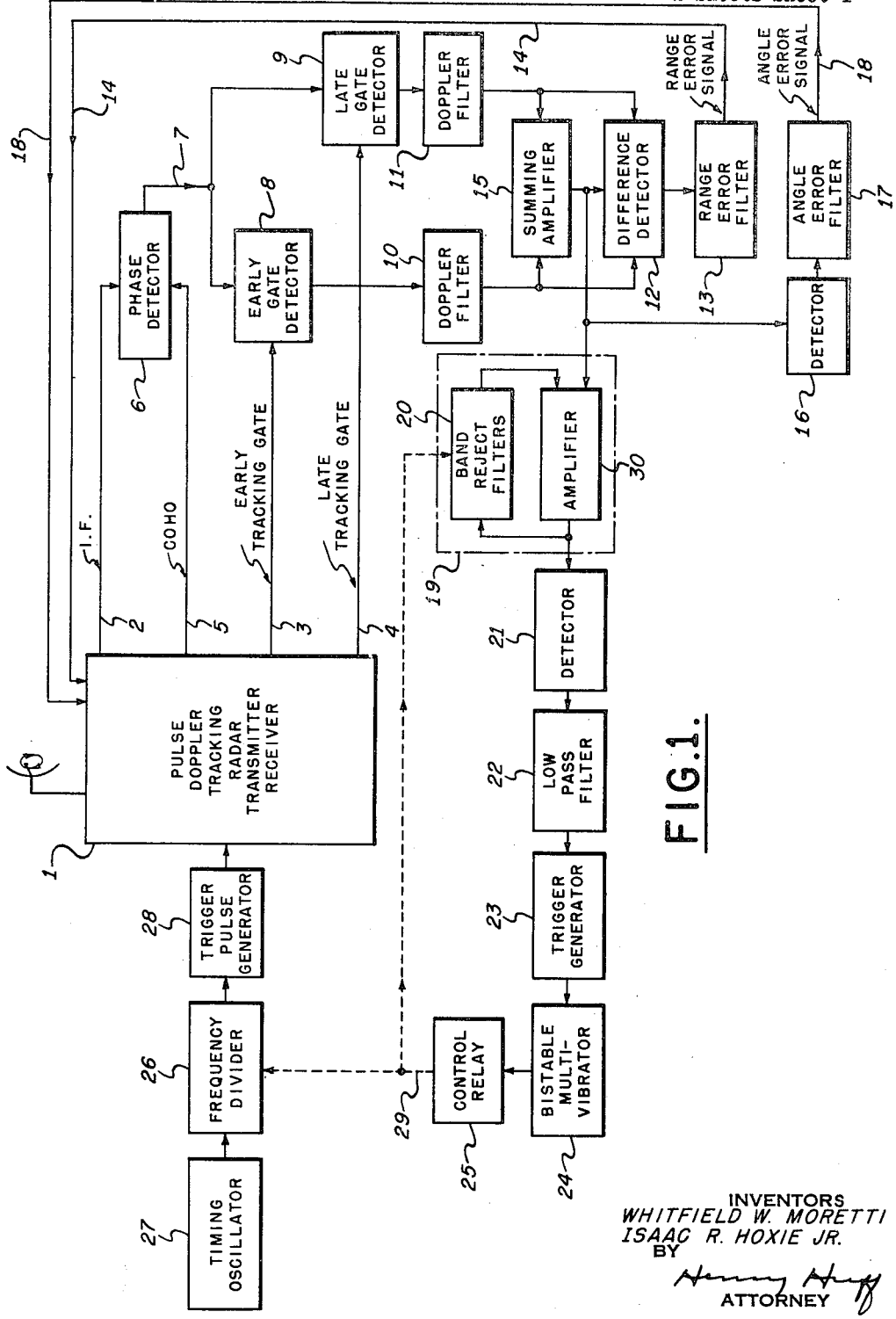
FIG. 1 is a block diagram of a preferred embodiment of the invention.

In FIG. 1, pulse doppler tracking radar transmitter-receiver 1 generally represents a conventional target tracking radar which produces on output lines 2, 3 and 4 respectively, target I.F. signals, an early range tracking gate and a late range tracking gate, respectively. The early and late tracking gates are automatically positioned within each radar repetition interval, in accordance with customary techniques, to coincide with the occurrence of the target signals being tracked. Transmitter-receiver 1 is further adapted to produce a coherent reference signal on output line 5 at the I.F. frequency. The coherent reference signal and target I.F. signal are applied to phase detector 6 which produces on output line 7 a signal containing the frequency components of diagram A of FIG. 2. The coherent reference signal may be produced by means known in the art which is discussed in chapter 16 of Radar System Engineering, volume 1 of the Radiation Laboratory Series, McGraw-Hill, 1947.

In the preferred embodiment, transmitter-receiver 1 includes means for conically scanning the antenna in order to generate signal components useful for the angular tracking of target signals. It will be seen, therefore, that the frequency spectrum of the signals appearing on line 7 includes the components indicated in diagram A of FIG. 2. Such components comprise the scan frequency $F_S$ (assumming a pointing error, i.e., that the target is situated off the antenna scanning axis), the doppler frequency $F_D$ (assuming the presence of a target having finite radial velocity) and the repetition rate components $F_R$, $2F_R$, $3F_R$, etc. These signal components intermodulate in phase detector 6 to produce the additional sum and difference signals $F_D \pm F_S$, $F_R \pm F_D$, $2F_R \pm F_D$, $3F_R \pm F_D$, etc. The D.C. component of diagram A is attributable to the presence of echos from fixed targets.

The signals appearing on line 7 at output of phase detector 6 are simultaneously applied to early and late gate detectors 8 and 9, respectively. Each of the detectors 8 and 9 preferably is of the so-called boxcar type and is actuated in response to a corresponding one of the gating signals produced on lines 3 and 4. Gated detectors 8 and 9 remove the repetition rate components $F_R$, $2F_R$ and $3F_R$, etc. of the signal spectrum of diagram A.

The output of each gated detector is filtered in a respective one of the doppler filters 10 and 11. The doppler filters are designed to pass the doppler frequency $F_D$ and its associated scan frequency sidebands. The lower limit of the passband of filters 10 and 11 is selected to reject the D.C. component attributable to the presence of targets having zero radial velocity, the scan frequency component $F_S$ resulting from pointing errors with respect to fixed targets, and the harmonics of such scan frequency components. The upper limit of each of filters 10 and 11 is approximately one-half the repetition rate of transmitter-receiver 1 and is selected to reject the scan frequency sidebands of the repetition frequency $(F_R \pm F_S)$ and its harmonics as well as the harmonics of the doppler frequency and residual repetition rate components. The frequency spectrum of the output of each of the doppler filters 10 and 11 is shown in diagram B of FIG. 2. The components of the signal represented by diagram B include the indicated doppler frequency $F_D$, its sidebands $F_D \pm F_S$, the difference frequency $F_R - F_D$ and the sidebands of the latter $(F_R - F_D) \pm F_S$. The last three components $F_R - F_D$ and $(F_R - F_D) \pm F_S$ are attenuated but not blocked by the doppler filters.

The range error signal, which is applied via line 14 to transmitter-receiver 1 for the automatic positioning of the early and late tracking gates in conventional range servo fashion, is developed in difference detector 12 and range error filter 13. The output of difference detector 12 is proportional to the unbalance in the outputs of the two gated detectors 8 and 9. The signal resulting from such unbalance is filtered in range error filter 13 to become the D.C. range error signal.

The doppler filter outputs are added in summing amplifier 15 to develop the angle error or pointing error signal to be used in positioning the antenna so that the target being tracked lies along the scanning axis. The output of summing amplifier 15 has the same frequency spectrum as does the output of doppler filters 10 and 11 excepting that it is not subject to variation due to changes in range error which is represented by the degree of unbalance between the outputs of the gated detectors 8 and 9. The signal produced by summing amplifier 15 is demodulated in detector 16 to produce the frequency components indicated in diagram C of FIG. 2. Angle error filter 17 extracts only the scanning frequency component $F_S$ (due to moving targets) and makes the extracted component available on line 18 for application to the automatic angle tracking circuits of transmitter-receiver 1.

Figure 2:
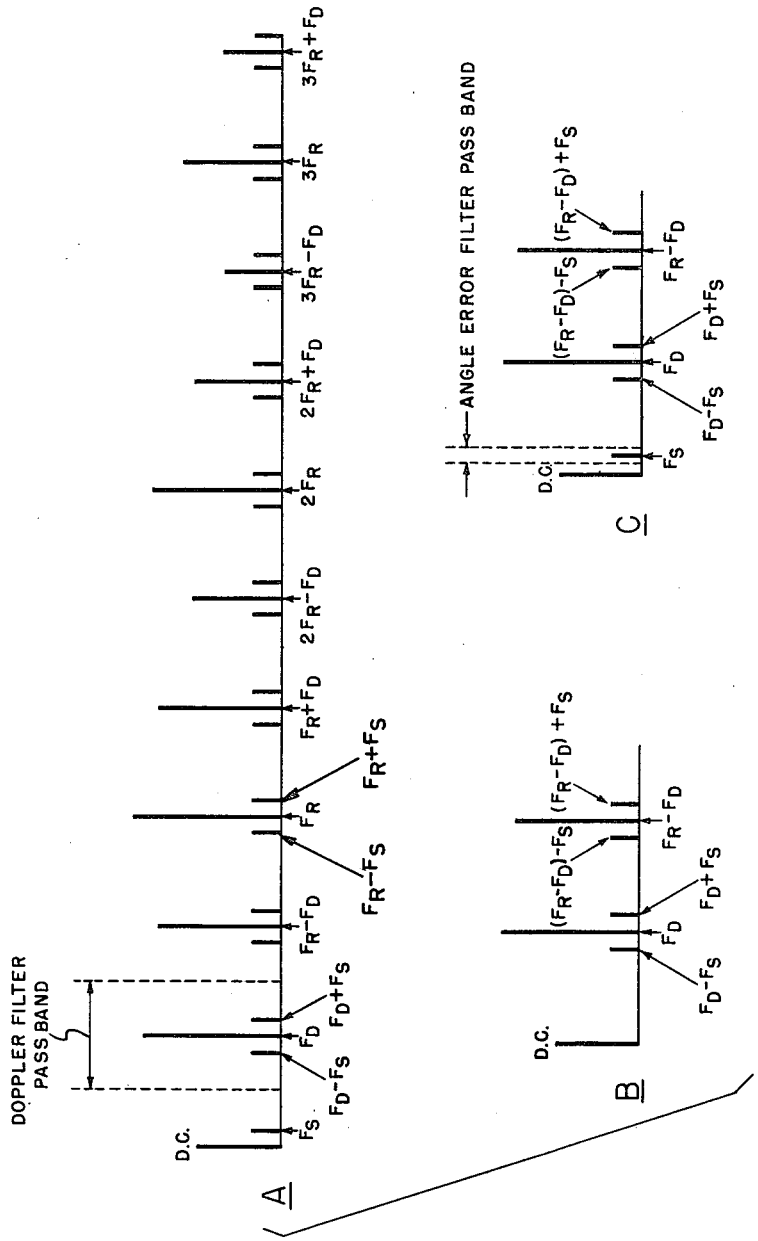
FIG. 2 is a series of signal spectrum diagrams useful in explaining the operation of the apparatus of FIG. 1.

The preceding discussion in connection with the diagrams of FIG. 2 is based on the assumption that the doppler frequency $F_D$ is less than half the repetition frequency $F_R$. Higher values of $F_D$ are attenuated by doppler filters 10 and 11. As previously explained, filters 10 and 11 have a high frequency cutoff of $F_R/2$. However, where $F_D$ exceeds $F_R/2$ (as would be the case with high radial velocity targets), the doppler difference frequency component $(F_R-F_D, 2F_R-F_D,$ etc.) at the output of gated detectors 8 and 9 falls within the passband of filters 10 and 11. Each of these different frequency components carries the scan modulating sidebands and, accordingly, can be used in developing the range and angle error signals. The operation of the system is the same as where $F_D$ is less than $F_R$ except that the output of the doppler filters 10 and 11 is at one of the frequencies $F_R-F_D, 2F_R-F_D,$ etc. instead of at $F_D$. For purposes of definition, doppler audio signal will be used to refer to the doppler filter output. Thus, the doppler audio signal is that one of the components $F_D$ or $F_R-F_D$, etc., which falls within the passband of the doppler filters.

Assuming a fixed repetition rate of transmitter-receiver 1, erratic tracking would result at certain target radial velocities because of the interdependence between the doppler frequency $F_D$ and the previously defined doppler audio signal. One case of erratic tracking occurs when the doppler frequency $F_D$ increases (in proportion to the target radial velocities) toward one-half the repetition rate $F_R$. At the same time, the difference frequency component $(F_R-F_D)$ would reduce toward $F_R/2$. As the two frequencies converge at $F_R/2$, their difference would become commensurate with the antenna scanning frequency. Inasmuch as both frequencies $F_D$ and $F_R-F_D$ would be passed by doppler filters 10 and 11 of FIG. 1 (because of their non-ideal high frequency cutoff characteristic), they would produce strong components near the antenna scanning frequency at the output of angle error filter 17. This component would bear no relationship to the pointing of the radar antenna and hence would interfere with the angular tracking of the target. As previously discussed, a second occasion of erratic tracking would occur when the doppler frequency $F_D$ approached the repetition rate $F_R$ at the so-called "blind speed."

In accordance with the present invention, both of these possible sources of erratic tracking are eliminated by the automatic discrete shifting of the radar pulse repetition rate. In the preferred embodiment, the shifting is from one to the other of two predetermined repetition rates. The shifting, occurs only when required, i.e., each time that the doppler audio signal at the output of summing amplifier 15 of FIG. 1 reaches either a predetermined low frequency (representative of clutter return) or higher frequency equaling one-half of the particular pulse repetition rate in use at the moment.

Returning to FIG. 1, the signal at the output of summing amplifier 15, having the frequency spectrum indicated in diagram B of FIG. 2, is applied to the input of frequency-selective amplifier 19. Amplifier 19 is operative to pass signals which occur at preselected frequencies determined by the frequency rejection band of filters 20 which are located in a negative feedback path around amplifier 30. Filters 20 are designed to reject signal frequencies having values substantially equal to one-half the pulse repetition rate of radar transmitter-receiver 1 and those representing targets having very low radial velocities (clutter signals). Amplifier 19 may be of a conventional type such as disclosed on page 403 of Vacuum Tube Amplifiers, volume 18 of the Radiation Laboratory Series, McGraw-Hill, 1948.

The clutter signals and the signals having frequency values equaling one-half the radar repetition rate are passed by frequency-selective amplifier 19 and are applied to detector 21 and low pass filter 22. The essentially D.C. voltage at the output of filter 22 resulting from the detected signal output of amplifier 19 is applied to trigger generator 23. Generator 23 produces a sharp trigger pulse each time that the D.C. signal reaches a predetermined value. The trigger pulses actuate bistable multivibrator 24, placing it in a condition opposite to that which pre-existed the occurrence of the trigger.

Control relay 25 is selectively energized upon the establishment of a predetermined one of the two alternate conditions of multivibrator 24. Relay 25, in turn, selectively adjusts frequency divider 26 and band rejection filters 20 in response to each energization. Frequency divider 26 receives an input signal from stablized timing oscillator 27 and applies a frequency divided version thereof to trigger pulse generator 28. Generator 28 produces triggers at the radar pulse repetition rate for the actuation of transmitter-receiver 1. Frequency divider 26 may be, for example, a monostable multivibrator whose recovery time is shifted between two predetermined values depending upon the energization of relay 25. As is well understood in the art, such a multivibrator is insensitive to triggers which are applied during the recovery period whereby the adjustment of the recovery time effects a change in the frequency division ratio afforded by the multivibrator.

Concurrently with the adjustment of the division ratio of divider 26, relay 25 correspondingly shifts the high frequency rejection band of filter 20 to substantially equal one-half the pulse repetition rate then produced at the output of generator 28. In the disclosed embodiment, a mechanical connection is shown between relay 25 and the adjusted devices 26 and 20. The movement of mechanical linkage 29 in response to the actuation of relay 25 determines in divider 26 the value of the recovery time circuit constant and in filter 20 the value of the lumped constants which determine the filter rejection band.

In operation, multivibrator 24 is triggered each time that the signal at the output of summing amplifier 15 reaches either the low frequency representing clutter return or a high frequency equaling one-half the radar repetition rate then in use. The triggering of multivibrator 24 alternately energizes control relay 25 to alternately shift both the radar repetition rate and the upper rejection frequency of filters 20 to the other of two predetermined values. The simultaneous repetition rate and rejection filter adjustment effectively avoids the appearance of signals at the output of doppler filters 10 and 11 which, in the case of a fixed radar repetition rate would give rise to "blind" and spurious responses. Should the velocity of the target being tracked continue to change so that the objectionable responses might occur at the new radar repetition rate, multivibrator 24 is again actuated causing both frequency divider 26 and filters 20 to return in their original settings. It can be seen that the invention utilizes the technique of shifting the radar pulse repetition rate from one to the other of two predetermined values each time that a target velocity situation is encountered which would, if unchecked, give rise to "blind" or spurious responses in the radar tracking circuits.

It should be noted that the present invention avoids resort to a fixed but unnecessarily high repetition rate in transmitter-receiver 1 which technique is well known in the art for minimizing objectionable tracking responses occurring at certain target radial velocities. By selectively operating at one of two or more predetermined and low repetition rates, the unambiguous range of the radar is not sacrificed for the sake of avoiding the objectionable responses. Moreover, the use of selectable but fixed repetition rates does not produce the complex intermodulation signal components that would otherwise continuously interfere with proper tracking operation if the prior art technique of jittered pulse repetition rate were employed.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. In a pulse doppler radar system including a receiver producing an output signal having frequency components related to the radial velocity of a detected target, means connected to said receiver for responding solely to a component having a fixed frequency value to generate a control signal upon the occurrence of said component, means for shifting the pulse repetition rate of said radar system from one to the other of two fixed values in response to an input signal, and means for applying said control signal as said input signal to said means for shifting.

2. In a pulse doppler radar system including a receiver producing an output signal having frequency components related to the radial velocity of a detected target, first means connected to said receiver for responding solely to a component having a selected one of two fixed frequency values to produce a control signal upon the occurrence of said component, second means connected to said first means for selecting the frequency value of the component that said first means responds to, said second means being actuated by an input signal, means for shifting the pulse repetition rate of said radar system from one to the other of two fixed values in response to an input signal, and means for applying said control signal as said input signals jointly to said second means and to said means for shifting.

3. A pulse doppler radar system as defined in claim 2 wherein the frequencies of the components to which said first means responds are substantially equal to one-half of respective ones of said two pulse repetition rate values.

4. In a pulse doppler radar system including a receiver producing an output signal having frequency components related to the radial velocity of a detected target, first means connected to said receiver for responding solely to components having a first fixed frequency value and a selectable one of second and third fixed frequency values to produce a control signal upon the occurrence of said fixed frequency components, second means connected to said first means for selecting which of said second and third fixed frequency value components said first means responds to, said second means being actuated by an input signal, means for shifting the pulse repetition rate of said radar system from one to the other of two fixed values in response to an input signal, and means for applying said control signal as said input signals jointly to said second means and to said means for shifting.

5. A pulse doppler radar system as defined in claim 4 wherein the frequencies of said second and third fixed frequency value components are equal to one-half of respective ones of said two pulse repetition rate values.

References Cited in the file of this patent

UNITED STATES PATENTS

| | | |
|---|---|---|
| 2,677,126 | Webb | Apr. 27, 1954 |
| 2,869,119 | Fredrick | Jan. 13, 1959 |
| 2,994,866 | McKay | Aug. 1, 1961 |